(12) United States Patent
Oh et al.

(10) Patent No.: US 9,151,365 B2
(45) Date of Patent: Oct. 6, 2015

(54) HYDRAULIC TIMING CHAIN TENSIONER AND TIMING CHAIN SYSTEM

(71) Applicants: Hyundai Motor Company, Seoul (KR); Kia Motors Corporation, Seoul (KR); Borgwarner Inc., Auburn Hills, MI (US)

(72) Inventors: Chung Han Oh, Seongnam-Si (KR); Dae Sung Kim, Hwaseong-si (KR); Kyoung Pyo Ha, Seoul (KR); Joong Soo Kim, Anyang-si (KR); Eui Chul Choi, Seoul (KR); Young-Taek Sun, Bucheon-si (KR); Won-Jung Kwon, Hwaseong-si (KR)

(73) Assignees: HYUNDAI MOTOR COMPANY, Seoul (KR); KIA MOTORS CORPORATION, Seoul (KR); BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 14/145,635

(22) Filed: Dec. 31, 2013

(65) Prior Publication Data

US 2015/0024887 A1      Jan. 22, 2015

(30) Foreign Application Priority Data

Jul. 18, 2013   (KR) .................. 10-2013-0084908

(51) Int. Cl.
*F16H 7/22*   (2006.01)
*F16H 7/08*   (2006.01)

(52) U.S. Cl.
CPC .......... *F16H 7/08* (2013.01); *F16H 2007/0872* (2013.01)

(58) Field of Classification Search
CPC ................ F16H 2007/0859; F16H 2007/0806; F16H 2007/0812; F16H 7/0848; F16H 2007/0891
USPC ........................................................ 474/110
See application file for complete search history.

(56) References Cited

U.S. PATENT DOCUMENTS

| 2,341,273 | A | * | 2/1944 | Helberg ................... 74/501.5 R |
| 2,644,492 | A | * | 7/1953 | Crane .............................. 83/819 |
| 2,736,927 | A | * | 3/1956 | Truslow et al. ................. 19/151 |
| 3,463,022 | A | * | 8/1969 | Miller ............................ 474/110 |
| 3,986,407 | A | * | 10/1976 | Naggert ........................ 474/110 |

(Continued)

FOREIGN PATENT DOCUMENTS

KR     10-2012-0068892 A     6/2012

*Primary Examiner* — Henry Liu
(74) *Attorney, Agent, or Firm* — Morgan, Lewis & Bockius LLP (57) ABSTRACT

The present invention relates to a timing chain system including a hydraulic pressure timing chain tensioner autonomously controlling a hydraulic pressure for maintaining tension of a timing chain to effectively operate. The system may include: a crankshaft sprocket; a camshaft sprocket controlling exhaust or intake timing of the engine; a timing chain operably connecting the crankshaft and camshaft sprockets; a chain guide for the timing chain; a chain tensioner pushing the chain guide inward; and an oil supply unit for the chain tensioner. The chain tensioner may include a housing, an operating unit case fixed to the housing, a reciprocating plunger inserted into the operating unit case, a high pressure chamber, a low pressure chamber, a supply hydraulic path supplying oil from the oil supply unit to the low pressure chamber, and a regulator controlling hydraulic pressure of the low pressure chamber.

11 Claims, 4 Drawing Sheets

(56) References Cited

U.S. PATENT DOCUMENTS

| | | | |
|---|---|---|---|
| 3,995,399 A * | 12/1976 | Weiner et al. | 451/311 |
| 4,094,205 A * | 6/1978 | Cook | 74/731.1 |
| 4,283,181 A * | 8/1981 | Sproul | 474/110 |
| 4,283,182 A * | 8/1981 | Kraft | 474/110 |
| 4,411,638 A * | 10/1983 | Wilson | 474/138 |
| 4,466,803 A * | 8/1984 | Wilson | 474/138 |
| 4,470,355 A * | 9/1984 | Kunczynski | 104/196 |
| 4,533,341 A * | 8/1985 | Yokota | 474/109 |
| 4,674,996 A * | 6/1987 | Anno et al. | 474/110 |
| 4,761,155 A * | 8/1988 | Kinoshita et al. | 474/110 |
| 4,889,087 A * | 12/1989 | Bergsten | 123/90.31 |
| 4,893,661 A * | 1/1990 | Onsrud | 144/135.2 |
| 5,159,904 A * | 11/1992 | Ingold | 123/90.15 |
| 5,205,331 A * | 4/1993 | Onsrud | 144/135.2 |
| 5,304,099 A * | 4/1994 | Deppe et al. | 474/110 |
| 5,531,648 A * | 7/1996 | Meckstroth et al. | 474/110 |
| 5,720,684 A * | 2/1998 | Mott | 474/110 |
| 6,151,924 A * | 11/2000 | Plath et al. | 66/132 T |
| 6,821,223 B2 * | 11/2004 | Henry | 474/134 |
| 6,953,407 B2 * | 10/2005 | Kitamura et al. | 474/135 |
| 7,552,708 B2 * | 6/2009 | Serkh et al. | 123/198 R |
| 7,927,242 B2 * | 4/2011 | Namie et al. | 474/109 |
| 8,012,051 B2 * | 9/2011 | Soga | 474/18 |
| 8,066,595 B2 * | 11/2011 | Ogata et al. | 474/28 |
| 2002/0039945 A1 * | 4/2002 | Ali et al. | 474/135 |
| 2009/0209378 A1 * | 8/2009 | Kurematsu | 474/110 |
| 2010/0087286 A1 * | 4/2010 | Larouche | 474/110 |
| 2011/0098145 A1 * | 4/2011 | Wang | 474/110 |
| 2011/0269585 A1 * | 11/2011 | Wang | 474/110 |
| 2012/0202629 A1 * | 8/2012 | O'Shea | 474/110 |

\* cited by examiner

HYDRAULIC TIMING CHAIN TENSIONER AND TIMING CHAIN SYSTEM

CROSS-REFERENCE TO RELATED APPLICATION

The present application claims priority of Korean Patent Application Number 10-2013-0084908 filed Jul. 18, 2013, the entire contents of which application is incorporated herein for all purposes by this reference.

BACKGROUND OF INVENTION

1. Field of Invention

The present invention relates to a hydraulic pressure timing chain tensioner and a timing chain system. More particularly, the present invention relates to a hydraulic pressure timing chain tensioner or which a pressure regulator is mounted therein and a timing chain system to which the tensioner is applied.

2. Description of Related Art

Generally, a timing chain for a vehicle is used for transmitting torque of a crankshaft to a camshaft in an engine.

A chain sprocket is respectively disposed at the crankshaft and the camshaft, and torque of the crankshaft is transmitted to the camshaft as the sprocket of the crankshaft and the sprocket of the camshaft are connected with each other by the timing chain.

A timing chain tensioner is provided so as to control tension of the timing chain surrounding the sprocket of the crankshaft and the sprocket of the camshaft. Particularly, a hydraulic pressure timing chain tensioner is configured to control tension of the timing chain by using a hydraulic pressure.

However, an ordinary hydraulic pressure timing chain tensioner cannot easily perform autonomous control of hydraulic pressure for suitably maintaining tension of the timing chain. In addition, when hydraulic pressure for maintaining tension of the timing chain is excessively supplied, a load applied to the chain and frictional force of the chain may be increased, and fuel consumption of an engine may be deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a hydraulic pressure timing chain tensioner and a timing chain system having advantages of autonomously controlling a hydraulic pressure for maintaining tension of a timing chain.

In addition, the present invention has been made in an effort to provide a hydraulic pressure timing chain tensioner and a timing chain system having a further advantage of effectively maintaining suitable tension of the timing chain by using a small hydraulic pressure.

Various aspects of the present invention provide for a hydraulic pressure timing chain tensioner that may include: a housing mounted at a cylinder block of an engine; an operating unit case formed in a hollow cylinder shape, inserted into the housing, and fixed inside of the housing; a plunger formed in a hollow cylinder shape, and disposed to be able to reciprocate in the hollow of the operating unit case; a high pressure chamber formed by the hollow of the operating unit case and the hollow of the plunger; a low pressure chamber formed inside of the housing, and communicating with the high pressure chamber; a supply hydraulic path formed at the housing so as to supply oil from the outside of the housing to the low pressure chamber; and a regulator controlling hydraulic pressure of the low pressure chamber, wherein hydraulic pressure of the high pressure chamber for reciprocating the plunger is controlled according to hydraulic pressure of the low pressure chamber controlled by the regulator.

The regulator may include: a piston disposed to be able to reciprocate in the low pressure chamber, and selectively opening/closing the supply hydraulic path according to the reciprocal motion; a spring contacting one end of the piston, and adapted to push the piston toward a direction of the other end of the piston; and a regulator cap contacting one end of the spring, and fixed to the housing so as to support the one end of the spring.

A piston hydraulic path may be formed inside of the piston, and the piston hydraulic path may receive a hydraulic pressure of the low pressure chamber and discharge the received hydraulic pressure toward the other end of the piston such that the piston is moved against a pressure of the spring toward a direction of the one end of the piston.

An external circumference groove recessed from an exterior circumference of the piston and extended along an external circumference may be formed at the exterior circumference of the piston, and the external circumference groove may be formed for selectively communicating the low pressure chamber with the supply hydraulic path.

The supply hydraulic path may be closed by the exterior circumference of the piston if the piston moves against a pressure of the spring toward a direction of the one end of the piston.

The external circumference groove may be disposed so as to communicate the low pressure chamber with the supply hydraulic path in a state that the other end of the piston contacts the housing if the piston moves toward a direction of the other end of the piston by the spring.

Various aspects of the present invention provide for a timing chain system that may include: a crankshaft sprocket rotated by power of an engine; a camshaft sprocket rotated by rotation of the crankshaft sprocket, and adapted to control exhaust or intake timing of the engine; a timing chain disposed to surround external circumferences of the crankshaft sprocket and the camshaft sprocket, and connecting the crankshaft sprocket and the camshaft sprocket; a chain guide guiding rotation of the timing chain; a chain tensioner adapted to push the chain guide toward a direction of the inside of the timing chain tensioner; and an oil supply unit supplying oil to the chain tensioner. The chain tensioner may include a housing mounted at a cylinder block of the engine, an operating unit case inserted into the housing and fixed to the housing, a plunger inserted into the operating unit case to be able to reciprocate, a high pressure chamber surrounded by the operating unit case and the plunger, a low pressure chamber communicating with the high pressure chamber, a supply hydraulic path formed to supply oil from the oil supply unit to the low pressure chamber, and a regulator controlling hydraulic pressure of the low pressure chamber.

Hydraulic pressures of the low pressure chamber and the high pressure chamber may be controlled by the regulator, and the plunger may be operated so as to push the chain guide toward the inside of the timing chain by hydraulic pressure of the high pressure chamber.

The regulator may include: a piston disposed to be able to reciprocate in the low pressure chamber, and selectively opening/closing the supply hydraulic path according to the reciprocal motion; a spring contacting one end of the piston, and adapted to push the piston toward a direction of the other end of the piston; and a regulator cap contacting one end of the spring, and fixed to the housing so as to support the one end of the spring.

A piston hydraulic path may be formed inside of the piston, and the piston hydraulic path may receive hydraulic pressure of the low pressure chamber and discharge the received hydraulic pressure toward the other end of the piston such that the piston is moved against a pressure of the spring toward a direction of the one end of the piston.

An external circumference groove recessed from an exterior circumference of the piston and extended along an external circumference may be formed at the exterior circumference of the piston, and the external circumference groove may be formed for selectively communicating the low pressure chamber with the supply hydraulic path.

The supply hydraulic path may be closed by the exterior circumference of the piston if the piston moves against a pressure of the spring toward a direction of the one end of the piston.

The external circumference groove may be disposed so as to communicate the low pressure chamber with the supply hydraulic path in a state that the other end of the piston contacts the housing if the piston moves toward a direction of the other end of the piston by the spring.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
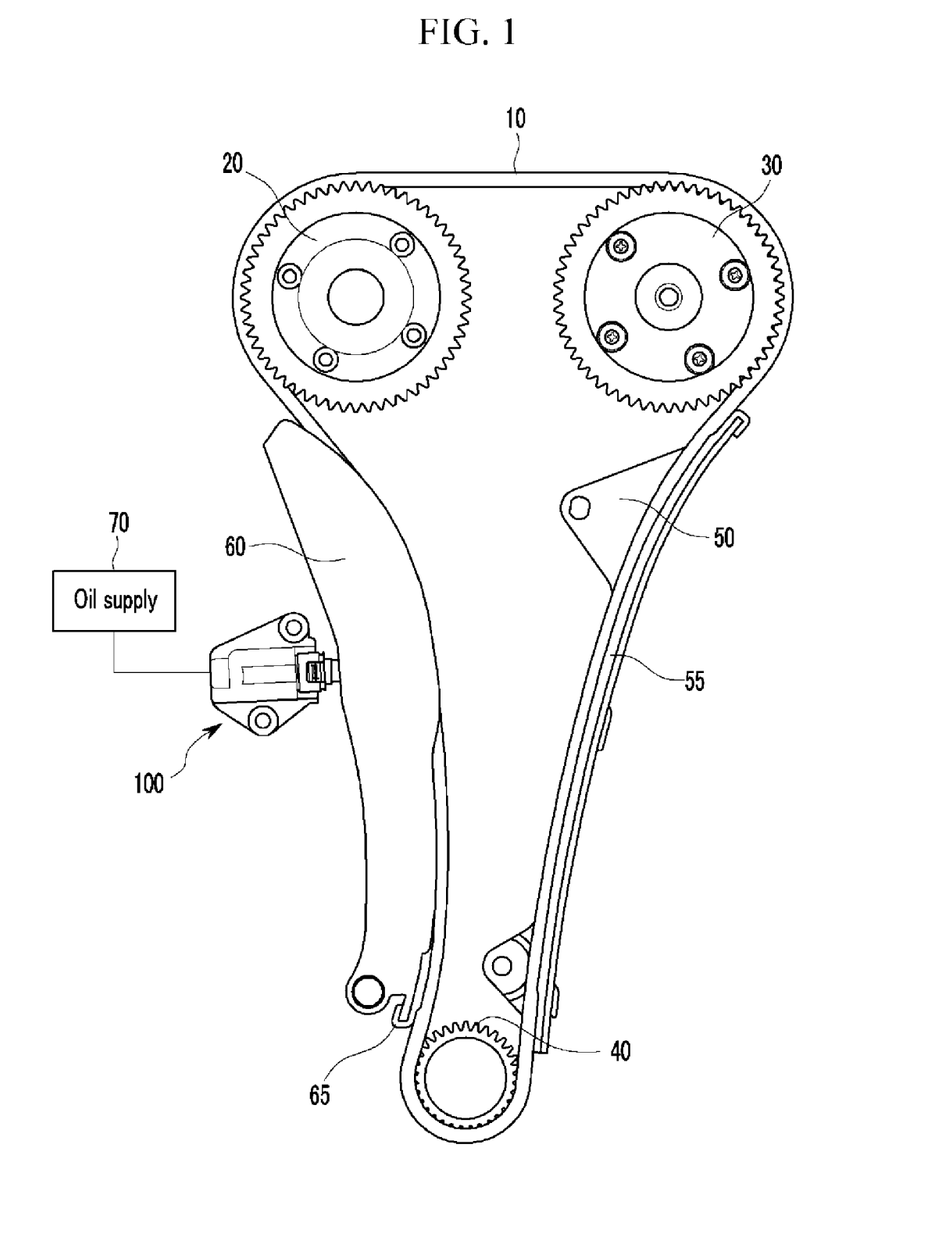
FIG. 1 is a schematic diagram of an exemplary timing chain system having a hydraulic pressure timing chain tensioner according to the present invention.

FIG. 1 is a schematic diagram of a timing chain system having a hydraulic pressure timing chain tensioner according to various embodiments of the present invention.

As shown in FIG. 1, a timing chain system according to various embodiments of the present invention includes a crankshaft sprocket 40, an exhaust camshaft sprocket 20, an intake camshaft sprocket 30, a timing chain 10, chain guides 50 and 60, a chain tensioner 100, and an oil supply unit 70.

The crankshaft sprocket 40 is disposed at one end of a crankshaft. In addition, the crankshaft sprocket 40 rotates together with the crankshaft.

The camshaft sprockets 20 and 30 are respectively disposed at one end of camshafts. In addition, the camshaft sprockets 20 and 30 rotate together with the camshafts.

The camshaft sprockets 20 and 30 include the exhaust camshaft sprocket 20 and the intake camshaft sprocket 30.

The camshafts may include an exhaust camshaft controlling open/close timing of exhaust valves and an intake camshaft controlling open/close timing of intake valves.

The exhaust camshaft sprocket 20 is disposed at one end of the exhaust camshaft so as to rotate together with the exhaust camshaft.

The intake camshaft sprocket 30 is disposed at one end of the intake camshaft so as to rotate together with the intake camshaft.

Generally, the crankshaft sprocket 40 and the camshaft sprocket 20 and 30 are collectively referred to as timing sprockets or timing gears. Herein, the sprocket is formed as a serrated wheel having teeth arranged with equivalent gaps therebetween.

The crankshaft sprocket 40 is connected with the camshaft sprockets 20 and 30 by a chain or a belt such that the crankshaft sprocket 40 and the camshaft sprockets 20 and 30 are synchronized. For example, the camshaft rotates at half the speed of the crankshaft in a 4-cycle engine.

The timing chain 10 is a chain connecting the crankshaft sprocket 40 with the camshaft sprocket 20 and 30. In addition, an inner surface of the timing chain 10 contacts the external circumferences of the crankshaft sprocket 40 and the camshaft sprockets 20 and 30. Further, the teeth arranged with equivalent gaps therebetween on the external circumferences of the crankshaft sprocket 40 and the camshaft sprockets 20 and 30 are engaged with the timing chain 10.

The chain guides 50 and 60 guide rotation of the timing chain 10 surrounding the external circumferences of the crankshaft sprocket 40 and the camshaft sprockets 20 and 30. In FIG. 1, the two chain guides 50 and 60 include a chain guide 60 disposed at a side of the exhaust camshaft sprocket 20 and a chain guide 50 disposed at a side of the intake camshaft sprocket 30.

The two chain guides 50 and 60 respectively have sliding units 55 and 65.

The sliding units 55 and 65 are disposed between the timing chain 10 and the chain guides 50 and 60, and are adapted to directly contact the timing chain 10. In addition, the sliding units 55 and 65 is adapted to smoothly slide the timing chain 10 along the chain guides 50 and 60. Shapes of the chain guides 50 and 60 and the sliding units 55 and 65 may be variously changed by a person of ordinary skill in the art.

The chain tensioner 100 is adapted to push the chain guides 50 and 60 toward a direction that the sliding units 55 and 65 contact the timing chain 10. That is, the chain tensioner 100 is mounted at a cylinder block so as to push an outer surface of the timing chain 10 in an inner direction, and tension of the timing chain 10 is controlled according to the force that the chain tensioner 100 imparts on the chain guides 50 and 60.

The oil supply unit 70 is a device which supplies oil to the chain tensioner 100 such that the chain tensioner 100 generates a hydraulic pressure for controlling tension of the timing chain 10. That is, the chain tensioner 100 is operated by oil supplied from the oil supply unit 70.

Figure 2:
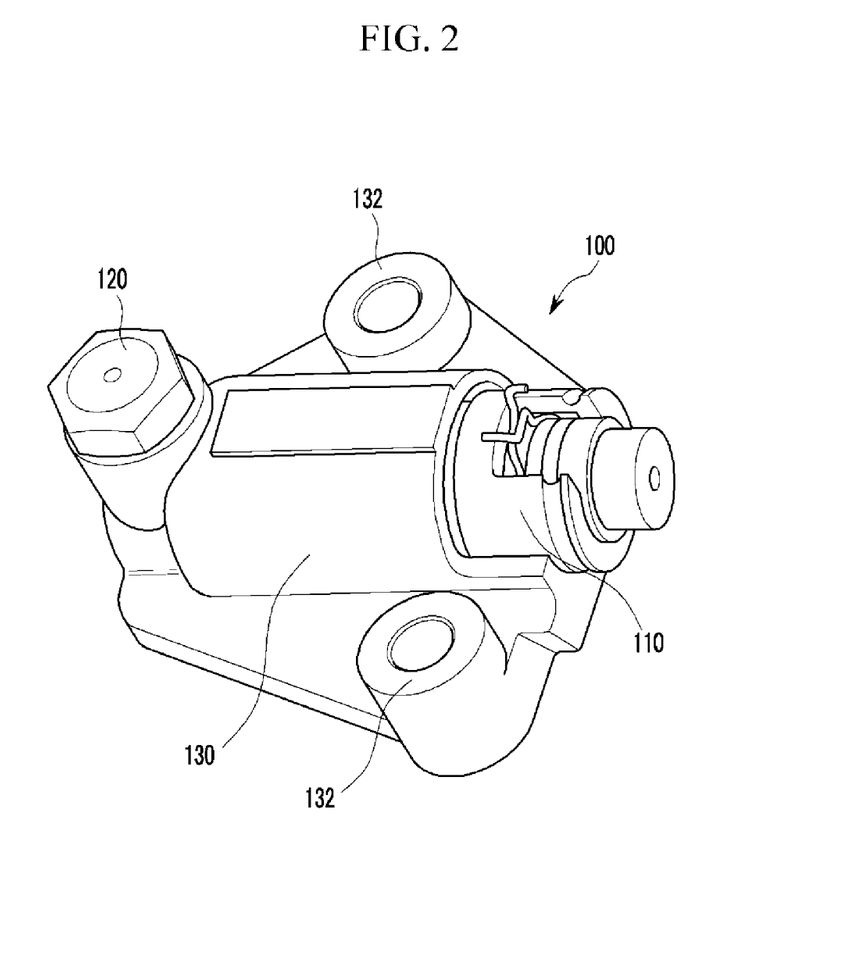
FIG. 2 is a perspective view of an exemplary hydraulic pressure timing chain tensioner according to the present invention.

FIG. 2 is a perspective view of a hydraulic pressure timing chain tensioner according to various embodiments of the present invention.

As shown in FIG. 2, the hydraulic pressure timing chain tensioner 100 according to various embodiments of the present invention includes a housing 130, an operating unit 110, and a regulator 120.

The housing 130 is a body of the chain tensioner 100, and the operating unit 110 and the regulator 120 are mounted therein. In addition, a coupling portion 132 is formed at the housing 130 so as to mount the chain tensioner 100 to the cylinder block.

The coupling portion 132 includes a hole through which a bolt penetrates such that the chain tensioner 100 is mounted to the cylinder block by bolting.

The operating unit 110 is operated to push the chain guides 50 and 60 by hydraulic pressure in the chain tensioner 100.

The regulator 120 controls the hydraulic pressure which is supplied for operating the operating unit 110.

Figure 3:
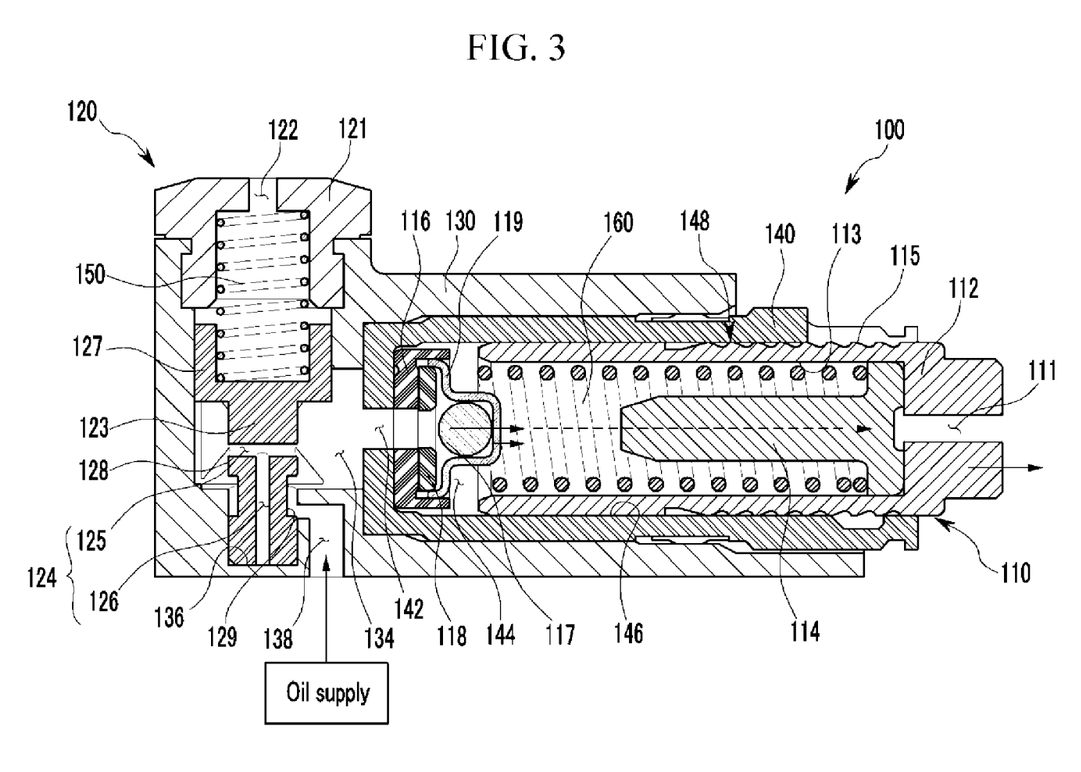
FIG. 3 is a cross-sectional view showing a state in which hydraulic pressure is supplied into a high pressure chamber of an exemplary hydraulic pressure timing chain tensioner according to the present invention.
Figure 4:
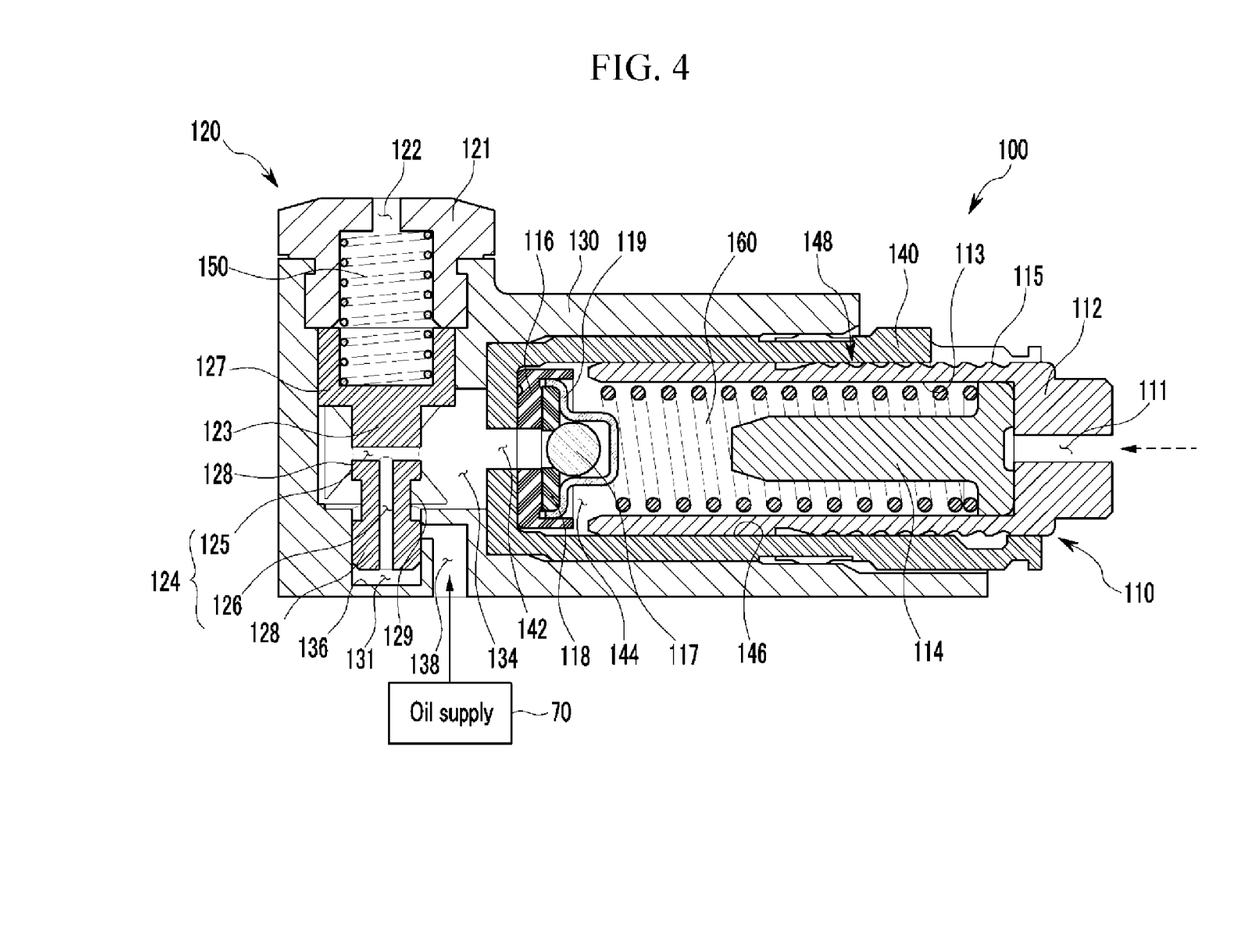
FIG. 4 is a cross-sectional view showing a state in which hydraulic pressure supplied to a high pressure chamber of an exemplary hydraulic pressure timing chain tensioner according to the present invention is released.

FIG. 3 is a cross-sectional view showing a state in which the hydraulic pressure is supplied into a high pressure chamber of a hydraulic pressure timing chain tensioner according to various embodiments of the present invention, and FIG. 4 is a cross-sectional view showing a state in which the hydraulic pressure supplied to a high pressure chamber of the hydraulic pressure timing chain tensioner according to various embodiments of the present invention is released.

As shown FIG. 3 and FIG. 4, a hydraulic pressure path is formed in the chain tensioner 100 such that a hydraulic pressure supplied from outside of the chain tensioner 100 to inside of the chain tensioner 100 is transmitted to the operating unit 110 via the regulator 120. In addition, the chain tensioner 100 further includes an operating unit case 140.

In the following description, directions of one end of elements composing the operating unit case 140 and the operating unit 110 are the same. In addition, directions of the other end of elements composing the operating unit case 140 and the operating unit 110 are the same. Further, the other end direction may be an opposite direction of the one end direction.

The operating unit case 140 is a case which covers the operating unit 110. In addition, the operating unit case 140 is formed in a hollow cylinder shape of which one end thereof is opened and the other end thereof is closed, and the closed other end is inserted into the housing 130. Further, the operating unit case 140 is fixed to the housing 130.

The operating unit 110 is disposed in the hollow of the operating unit case 140. In addition, the operating unit 110 includes check ball assembly (116, 117, 118, and 119), a plunger 112, a vent disc 114, and a plunger spring 160. Elements composing the operating unit 110 may be inserted into the hollow of the operating unit case 140 through the opened one end of the operating unit case 140 when assembling the chain tensioner 100.

The check ball assembly (116, 117, 118, and 119) is disposed near the other end of the operating unit case 140 in the hollow of the operating unit case 140. In addition, the check ball assembly (116, 117, 118, and 119) includes a check ball housing 116, a check ball 117, a check ball plate 118, and a check ball retainer 119.

The check ball housing 116 is formed in a hollow cylinder shape of which one end thereof is opened and the other end thereof is closed. In addition, the cylinder shape of the check ball housing 116 has a height that is shorter than a diameter thereof. Further, the closed other end of the check ball housing 116 is fixed to and contacts the other end of the operating unit case 140 in the hollow of the operating unit case 140.

The check ball 117, the check ball plate 118, and the check ball retainer 119 are disposed in the hollow of the check ball housing 116.

The check ball plate 118 contacts the other of the check ball housing 116 in the hollow of the check ball housing 116.

The check ball 117 is seated at a center portion of the check ball plate 118.

The check ball retainer 119 is disposed at a side of the one end of the check ball housing 116 so as to cover the check ball 117 and the check ball plate 118.

The construction of the check ball assembly (116, 117, 118, and 119) is well-known to a person of ordinary skill in the art such that a detailed description thereof will be omitted.

The plunger 112 is formed in a hollow cylinder shape of which one end thereof is closed and the other end thereof is opened. In addition, the opened other end of plunger 112 is inserted into the hollow of the operating unit case 140 through the opened one end of the operating unit case 140. Herein, the other end of the plunger 112 is inserted to near a position where the check ball assembly (116, 117, 118, and 119) is disposed. Further, an exterior circumference 115 of the plunger 112 is closely disposed to an interior circumference 146 of the operating unit case 140. That is, the plunger 112 and the operating unit case 140 are disposed such that airtightness is ensured between the exterior circumference 115 of the plunger 112 and the interior circumference 146 of the operating unit case 140.

The vent disc 114 and the plunger spring 160 are disposed in the hollow of the plunger 112.

One end of the vent disc 114 contacts the closed one end of the plunger 112 in the hollow of the plunger 112. In addition, the vent disc 114 is disposed such that airtightness is ensured between an interior circumference 113 of the plunger 112 and the vent disc 114.

The plunger spring 160 is disposed between the opened other end of the plunger 112 and the vent disc 114. The plunger spring 160 may be a coil spring. In addition, the other end of the vent disc 114 is protruded toward the inside of the plunger spring 160 from the one end of the vent disc 114 airtightly disposed with the plunger 112. Thus, the plunger spring 160 and the vent disc 114 are stably disposed. Further, one end of the plunger spring 160 is supported to the other end of the vent disc 114, and the other end of the plunger spring 160 is supported at the opened other end of the plunger 112 so as to not escape from the hollow of the plunger 112.

The regulator 120 is disposed near the other end of the operating unit case 140 at the outside of the operating unit case 140.

In the following description, directions of one end of elements comprising the regulator 120 are the same. In addition, directions of the other end of elements including the regulator 120 are the same. Further, the other end direction may be an opposite direction of the one end direction.

The regulator 120 includes a regulator cap 121, a piston 123, and a piston spring 150.

The regulator cap 121 is formed in a hollow cylinder shape of which one end thereof is closed and the other end is opened. In addition, the opened other end of the regulator cap 121 is inserted into the housing 130. Further, the regulator cap 121 is fixed to the housing 130.

The piston 123 is disposed a side of the other end of the regulator cap 121, and the piston spring 150 is disposed between the regulator cap 121 and the piston 123.

The piston 123 includes a supporting portion 127 and a protrusion portion 128.

The supporting portion 127 is formed at one end of the piston 123, and has a hollow cylinder shape of which one end thereof is opened and the other end thereof is closed. In addition, the cylinder shape of the supporting portion 127 has a height that is shorter than a diameter thereof.

One end of the piston spring 150 is inserted into the hollow of the regulator cap 121 and is supported by the regulator cap 121, and the other end of the piston spring 150 is inserted into the hollow of the piston 123 and contacts the one end of the piston 123 so as to push the one end of the piston 123 toward a direction of the other end of the piston 123. The piston spring 150 may be a coil spring.

The supporting portion 127 is disposed such that airtightness is ensured between an exterior circumference of the supporting portion 127 and an interior surface of the housing 130. That is, the exterior circumference of the supporting portion 127 contacts the interior surface of the housing 130.

The protrusion portion 128 is formed in a cylinder shape protruded from the closed other end of the supporting portion 127. That is, the protrusion portion 128 has the cylinder shape of which a diameter thereof is shorter than a diameter the supporting portion 127. The protrusion portion 128 includes a piston hydraulic path 124 and an external circumference groove 129.

The piston hydraulic path 124 is a hydraulic path which is formed for reciprocating the piston 123 in the housing 130. In addition, the piston hydraulic path 124 is composed of a penetrating path 125 penetrating the protrusion portion 128 of the piston 123 along a diameter direction and a bifurcated path 126 bifurcated from the penetrating path 125 and then extended to the other end of the protrusion portion 128. Further, the bifurcated path 126 communicates with the outside of the piston 123 through the other end of the protrusion portion 128.

The external circumference groove 129 is formed at an exterior circumference of the protrusion portion 128. In addition, the external circumference groove 129 is formed with a groove shape recessed from the exterior circumference of the protrusion portion 128 and is extended along an external circumference direction of the protrusion portion 128.

The housing 130 further includes a supply hydraulic path 138, a low pressure chamber 134, and a contacting surface 136, and the operating unit 110 further includes a plunger hydraulic path 142, a high pressure chamber 144, and a plunger hole 111, and the regulator 120 further includes a cap hole 122.

The supply hydraulic path 138 is formed so as to supply oil from the outside to the inside of the housing 130 of the chain tensioner 100. In addition, the supply hydraulic path 138 communicates with the low pressure chamber 134.

The low pressure chamber 134 is a space which is formed near the other end of the operating unit case 140 at the outside of the operating unit case 140. In addition, the low pressure chamber 134 is a space where the protrusion portion 128 of the piston 123 is disposed. Further, the low pressure chamber 134 communicates with the supply hydraulic path 138 through the external circumference groove 129 of the piston 123. That is, the external circumference groove 129 can selectively communicate the low pressure chamber 134 with the supply hydraulic path 138 according to the reciprocal motion of the piston 123.

The contacting surface 136 may or may not contact according to the reciprocal motion of the piston 123. In addition, a push chamber 131 is formed between the contacting surface 136 and the protrusion portion 128 when the contacting surface 136 and the protrusion portion 128 do not contact each other. Further, the piston 123 is moved toward a direction of the one end thereof if hydraulic pressure is generated in the push chamber 131.

The plunger hydraulic path 142 is formed to penetrate the operating unit case 140, the check ball housing 116, and the check ball plate 118 from the closed other end of the operating unit case 140. In addition, the check ball 117 is seated on the plunger hydraulic path 142 penetrating the check ball plate 118 in one end of the check ball plate 118. That is, one end of the plunger hydraulic path 142 is closed by the check ball 117. Further, the one end of the plunger hydraulic path 142 can be opened according to movement of the check ball 117.

If the one end of the plunger hydraulic path 142 is opened, the plunger hydraulic path 142 communicates with the high pressure chamber 144.

The high pressure chamber 144 is a space which is formed between the vent disc 114 and the check ball assembly (116, 117, 118, and 119).

The plunger hole 111 is a hole which is formed so as to communicate the hollow of the plunger 112 with the outside of the plunger 112 at the one end of the plunger 112. In addition, the plunger hole 111 is formed when oil is exhausted through between the vent disc 114 and the interior circumference 113 of the plunger 112 from the high pressure chamber 144 even though airtightness is ensured between the vent disc 114 and the interior circumference 113 of the plunger 112, for draining the exhausted oil to the outside of the plunger 112.

The cap hole 122 is a hole which is formed so as to communicate the hollow of regulator cap 121 with the outside of the regulator 120 at one end of the regulator cap 121. In addition, the cap hole 122 is formed when oil is exhausted between the housing 130 and the supporting portion 127 from the low pressure chamber 134 even though airtightness is ensured between the housing 130 and the supporting portion 127 of the piston 123, for draining the exhausted oil to the outside of the regulator 120.

Hereinafter, an operation of a hydraulic pressure timing chain tensioner 100 according to various embodiments of the present invention will be described in detail referring to FIG. 3 and FIG. 4.

As shown in FIG. 3, the external circumference groove 129 communicates the supply hydraulic path 138 with the low pressure chamber 134 in the state that the other end of the protrusion portion 128 contacts the contacting surface 136. At this time, if oil is supplied from the oil supply unit 70 to the low pressure chamber 134 through the supply hydraulic path 138, the check ball 117 and check ball retainer 119 are moved toward a direction of the one end of the operating unit 110 by hydraulic pressure generated from the low pressure chamber 134, and thus hydraulic pressure of the low pressure chamber 134 is transmitted to the high pressure chamber 144 through the plunger hydraulic path 142. Meanwhile, oil filled to the piston hydraulic path 124 by hydraulic pressure of the low pressure chamber 134 cannot have sufficient hydraulic pressure for moving the piston 123 toward a direction of the one end of the regulator 120 against force of the piston spring 150 pushing the piston 123.

The plunger 112 is moved in a direction of the one end of the operating unit 110 by hydraulic pressure transmitted to the high pressure chamber 144. In addition, the plunger 112 moves toward a direction of the one end of the operating unit 110 so as to push the chain guides 50 and 60, and maintain tension of the timing chain 10. At this time, the vent disc 114 moves toward a direction of the one end of the operating unit 110 and assists the movement of the plunger 112. Meanwhile, the vent disc 114 is interworked with the plunger spring 160 such that the plunger 112 is stably moved in case the movement of the plunger 112 is excessively fast.

Meanwhile, a ratchet 148 preventing reversal of the movement of the plunger 112 is respectively formed at the exterior circumference 115 of the plunger 112 and the interior circumference 146 of the operating unit case 140. The shape and the function of the ratchet 148 are well-known to a person of ordinary skill in the art such that a detailed description thereof will be omitted.

As shown in FIG. 4, the plunger 112 is moved toward a direction of the other end of the operating unit 110 if the plunger 112 is pushed by the timing chain 10. In addition, the plunger 112 is quickly moved toward a direction of the other end of the operating unit 110 by momentary force transmitted from the timing chain 10. Therefore, hydraulic pressure of the high pressure chamber 144 is instantaneously increased. At this time, hydraulic pressure of the high pressure chamber 144 is transmitted to the low pressure chamber 134 while oil is continuously supplied from the oil supply unit 70 to the low pressure chamber 134 through the supply hydraulic path 138. That is, hydraulic pressure of the low pressure chamber 134 is instantaneously and drastically increased.

As hydraulic pressure of the low pressure chamber 134 is instantaneously increased, oil having flowed into the inside of the piston 123 through the penetrating path 125 of the piston hydraulic path 124 is transmitted to the bifurcated path 126 of the piston hydraulic path 124. In addition, sufficient hydraulic pressure for moving the piston 123 toward a direction of the one end of the regulator 120 against the force of the piston spring 150 pushing the piston 123 is generated in the piston hydraulic path 124. Therefore, the piston 123 moves toward a direction of the one end of the regulator 120, and thus the push chamber 131 is formed. Further, the piston 123 is further smoothly moved toward a direction of the one end of the regulator 120 as hydraulic pressure is generated in the push chamber 131.

The piston 123 moves toward a direction of the one end of the regulator 120, and the supply hydraulic path 138 is closed by the exterior circumference of the protrusion portion 128 of the piston 123. That is, hydraulic pressure of the low pressure chamber 134 is prevented from being excessively increased as supply of oil from the oil supply unit 70 to the low pressure chamber 134 through the supply hydraulic path 138 is stopped.

According to various embodiments of the present invention, suitable tension of the timing chain 10 can be maintained by using a small hydraulic pressure for the chain tensioner 100 at which the pressure regulator is mounted. In addition, fuel consumption of an engine can be improved as hydraulic pressure for maintaining tension of the timing chain 10 is prevented from being excessively supplied. Further, durability of the timing chain 10 is improved as a load applied to the timing chain 10 and frictional force of the timing chain 10 can be decreased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure timing chain tensioner comprising:
   a housing configured for mounting to a cylinder block of an engine;
   an operating unit case having a hollow cylinder shape, inserted into the housing, and fixed inside of the housing;
   a plunger having a hollow cylinder shape and disposed to reciprocate within a hollow of the operating unit case;
   a high pressure chamber formed by the hollow of the operating unit case and a hollow of the plunger;
   a low pressure chamber partially defined by the housing and communicating with the high pressure chamber;
   a supply hydraulic path formed in the housing to supply oil from an oil supply to the low pressure chamber; and
   a regulator controlling hydraulic pressure of the low pressure chamber;
   wherein hydraulic pressure of the high pressure chamber for reciprocating the plunger is controlled according to hydraulic pressure of the low pressure chamber controlled by the regulator,
   wherein the regulator comprises:
      a piston disposed to reciprocate in the low pressure chamber, and selectively opening and closing the supply hydraulic path according to the reciprocal motion;
      a spring contacting one end of the piston, and adapted to push the piston toward a direction of another end of the piston; and
      a regulator cap contacting one end of the spring, and fixed to the housing to support the one end of the spring.

2. The hydraulic pressure timing chain tensioner of claim 1, wherein a piston hydraulic path is formed inside of the piston, and the piston hydraulic path receives a hydraulic pressure of the low pressure chamber and discharges the received hydraulic pressure toward the other end of the piston such that the piston is moved against a pressure of the spring toward a direction of the one end of the piston.

3. The hydraulic pressure timing chain tensioner of claim 2, wherein an external circumference groove recessed from an exterior circumference of the piston and extended along an external circumference is formed at the exterior circumference of the piston, and the external circumference groove is formed for selectively communicating the low pressure chamber with the supply hydraulic path.

4. The hydraulic pressure timing chain tensioner of claim 3, wherein the supply hydraulic path is closed by the exterior circumference of the piston when the piston moves against a pressure of the spring toward a direction of the one end of the piston.

5. The hydraulic pressure timing chain tensioner of claim 3, wherein the external circumference groove is disposed to communicate the low pressure chamber with the supply hydraulic path in a state that the other end of the piston contacts the housing when the piston moves toward a direction of the other end of the piston by the spring.

6. A timing chain system comprising:
   an engine-driven crankshaft sprocket;
   a camshaft sprocket rotated by rotation of the crankshaft sprocket and adapted to control exhaust or intake timing of an engine;

a timing chain disposed around the crankshaft and camshaft sprockets operably connecting the crankshaft and camshaft sprockets;
a chain guide guiding rotation of the timing chain;
a chain tensioner adapted to push the chain guide against the timing chain; and
an oil supply unit supplying oil to the chain tensioner;
wherein the chain tensioner comprises:
- a housing configured for mounting to a cylinder block of the engine;
- an operating unit case inserted into the housing and fixed to the housing;
- a reciprocating plunger extending into the operating unit case;
- a high pressure chamber defined by the operating unit case and the plunger;
- a low pressure chamber fluidly communicating with the high pressure chamber;
- a supply hydraulic path supplying oil from the oil supply unit to the low pressure chamber; and
- a regulator controlling a hydraulic pressure of the low pressure chamber,
wherein the regulator comprises:
   - a reciprocating piston disposed in the low pressure chamber, and selectively opening and closing the supply hydraulic path according to the reciprocal motion;
   - a spring contacting one end of the piston, and adapted to push the piston toward a direction of another end of the piston; and
   - a regulator cap contacting one end of the spring, and fixed to the housing to support the one end of the spring.

7. The timing chain system of claim 6, wherein hydraulic pressures of the low pressure chamber and the high pressure chamber are controlled by the regulator, and the plunger is operated to push the chain guide toward the timing chain by hydraulic pressure of the high pressure chamber.

8. The timing chain system of claim 6, wherein a piston hydraulic path is formed inside of the piston, and the piston hydraulic path receives hydraulic pressure of the low pressure chamber and discharges the received hydraulic pressure toward the other end of the piston such that the piston is moved against a pressure of the spring toward a direction of the one end of the piston.

9. The timing chain system of claim 8, wherein an external circumference groove recessed in an exterior circumference of the piston and extended along an external circumference is formed at the exterior circumference of the piston, and the external circumference groove is formed for selectively communicating the low pressure chamber with the supply hydraulic path.

10. The timing chain system of claim 9, wherein the supply hydraulic path is closed by the exterior circumference of the piston when the piston moves against a pressure of the spring toward a direction of the one end of the piston.

11. The timing chain system of claim 9, wherein the external circumference groove is disposed to communicate the low pressure chamber with the supply hydraulic path in a state that the other end of the piston contacts the housing when the piston moves toward a direction of the other end of the piston by the spring.

* * * * *